United States Patent
Goodknight

(10) Patent No.: US 7,808,981 B1
(45) Date of Patent: Oct. 5, 2010

(54) PACKET TELEPHONY ACROSS THE PUBLIC SWITCHED TELEPHONE NETWORK

(75) Inventor: Gregory Warren Goodknight, Nevada City, CA (US)

(73) Assignee: Cisco Technology, Inc., San Jose, CA (US)

( * ) Notice: Subject to any disclaimer, the term of this patent is extended or adjusted under 35 U.S.C. 154(b) by 1937 days.

(21) Appl. No.: 09/773,393

(22) Filed: Jan. 31, 2001

(51) Int. Cl.
   *H04L 12/66* (2006.01)
(52) U.S. Cl. .................... 370/355; 370/352; 370/466
(58) Field of Classification Search ........ 370/352–355, 370/357, 389, 465, 466; 379/221.01, 219, 379/224
   See application file for complete search history.

(56) References Cited

U.S. PATENT DOCUMENTS

| | | | |
|---|---|---|---|
| 4,903,260 A | | 2/1990 | Boettle et al. |
| 5,014,266 A | * | 5/1991 | Bales et al. ............... 370/354 |
| 5,347,516 A | | 9/1994 | Yoshida |
| 5,483,524 A | * | 1/1996 | Lev et al. .................. 370/355 |
| 5,793,810 A | * | 8/1998 | Han et al. .................. 375/242 |
| 5,847,752 A | * | 12/1998 | Sebestyen ............... 348/14.12 |
| 5,905,781 A | * | 5/1999 | McHale et al. .......... 379/93.14 |
| 6,219,378 B1 | * | 4/2001 | Wu .......................... 375/231 |
| 6,272,358 B1 | * | 8/2001 | Brent et al. ................ 455/560 |
| 6,304,565 B1 | * | 10/2001 | Ramamurthy ............ 370/352 |
| 6,304,578 B1 | * | 10/2001 | Fluss ........................ 370/413 |
| 6,363,065 B1 | * | 3/2002 | Thornton et al. .......... 370/352 |
| 6,374,288 B1 | * | 4/2002 | Bhagavath et al. ........ 709/203 |
| 6,377,570 B1 | | 4/2002 | Vaziri et al. ............... 370/352 |
| 6,389,065 B1 | * | 5/2002 | McGhee .................. 375/222 |
| 6,515,997 B1 | * | 2/2003 | Feltner et al. ............. 370/401 |
| 6,628,617 B1 | * | 9/2003 | Karol et al. ............... 370/237 |
| 6,671,272 B2 | | 12/2003 | Vaziri et al. ............... 370/352 |
| 6,683,881 B1 | * | 1/2004 | Mijares et al. ............ 370/401 |

FOREIGN PATENT DOCUMENTS

| | | |
|---|---|---|
| CA | 2265776 | 4/1998 |
| EP | 0 732 835 | 9/1996 |
| EP | 978984 A2 * | 2/2000 |

(Continued)

OTHER PUBLICATIONS

Osifchin, N., "A Telecommunications Buildings/Power Infrastructure in a New Era of Public Networking," Telecommunications Energy Conference. Sep. 10-14, 2000. pp. 1-7.*

(Continued)

*Primary Examiner*—Donald Mills
(74) *Attorney, Agent, or Firm*—Marger Johnson & McCollom, P.C.

(57) ABSTRACT

A network device that allows packet relay across a public switched telephone network. The network device has a converter operable to convert a packet data stream to a public switched telephone network data stream. The converter may be a voice codec or a modem, as examples. The network device also includes a controller that can send signals in the public switched telephone network data stream identifying the network device as a packet device, receive signals indicating at least one other network devices are participating in a public switched transmission session with the network device, and then send the packet data stream across the public switched transmission network directly to the at least one other network device.

10 Claims, 2 Drawing Sheets

FOREIGN PATENT DOCUMENTS

| EP | 1 014 632 | 6/2000 |
|----|-----------|--------|
| GB | 2283154 | 4/1995 |
| WO | WO 90/12466 | 10/1990 |
| WO | WO 95/25407 | 9/1995 |
| WO | WO 95/31060 | 11/1995 |
| WO | WO 97/18665 | 5/1997 |
| WO | WO 9827698 A1 * | 6/1998 |

OTHER PUBLICATIONS

Osifchin, N., "An Infrastructure for Telecommunications Power in a New Era in Public Networking," Telecommunications Energ Special. May 7-10, 2000. pp. 23-28.*

ITU-T V.8 bis Sep. 1998, "Series V: Data Communication Over the Telephone Network," 1999. pp. 1-49.*

ITU-T Recommendation V.8 (Feb. 1998) (Superceded by a more recent version not yet published) *Series V: Data Communication Over the Telephone Network*, "Procedures for starting sessions of data transmission over the public switched telephone network".

Draft ITU-T Recommendation H.323 entitled "Visual Telephone Systems and Equipment for Local Area Networks which Provide a Non-Guaranteed Quality of Service", SG15 Plenary May 28, 1996.

Nakamura Y. et al.: "On a Hybrid Network System of Circuit Switching and Packet Switching", *The Transactions of the IECE of Japan*, vol. E 65, No. 6, Abstracts, Jun. 6, 1982.

Low C. et al.: "WEBIN—an Architecture for Fast Deployment of In-Based Personal Services", Workshop Record, Intelligent Network, Freedom and Flexibility: Realising the Promise of Intelligent Network Services, p. 1-12, Apr. 21, 1996, XP002043670.

Babbage R. et al.: "Internet Phone—Changing the Telephony Paradigm?", BT Technical Journal, vol. 15, No. 2, Apr. 1997, p. 145-157, XP000676853.

Verified translation of EP 1014632 submitted to the United Kingdom Patent Office, Jul. 5, 2005.

* cited by examiner

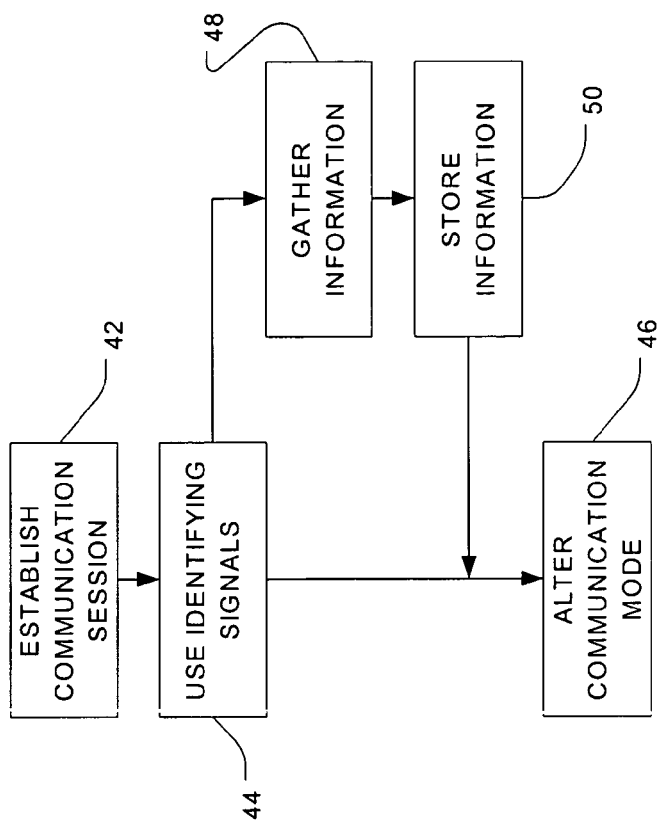
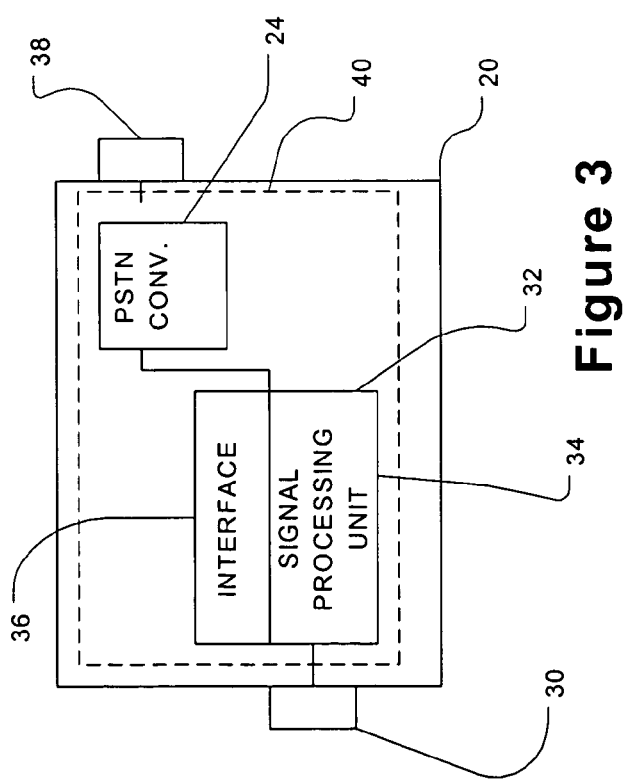

PACKET TELEPHONY ACROSS THE PUBLIC SWITCHED TELEPHONE NETWORK

BACKGROUND

1. Field

This disclosure relates to transmission of packets across the public switched telephone network (PSTN), more particularly to conversion of a PSTN telephone call to transport a packet telephone call between two separate packet network domains.

2. Background

Currently, it is possible to place calls to the PSTN from a packet domain. The packet domain first must convert the packet to a proper format for transmission across the PSTN. For example, a packet voice call must be converted via the appropriate voice coder/decoder (codec). The data packets containing the data representative of speech are converted by a voice codec into a digitized stream of signals that can be reconstructed on the other send of the call into an audio signal. Coding of voice signals generally fall in the G.7XX family of codecs.

The International Telephony Union (ITU) has several different standards for coding of voice signals. Examples include G.711 voice coding at 64,000 bits per second (kbps) in a scheme referred to as Pulse Code Modulation (PCM), and G.726 using Adaptive Differential PCM (ADPCM). The specifics of these various standards are outside the scope of this disclosure. However the voice signal is coded, it will be decoded at the receiving end by a codec that uses the same standard resulting in an audio output to the listener.

If the PSTN is then connected to another packet network domain via a network gateway or other network device, unnecessary steps of coding at the sending end and decoding at the receiving end may occur. As can be seen in FIG. 1, the packet domain device 10 uses a PSTN converter 14 to converts the packets into the appropriate format for transmission across the PSTN. The receiving device 12, also a packet domain device, receives it in this PSTN format and then has to decode it and reconvert it back to packet format using PSTN converter 16. The sending device 10 had no way of knowing or discovering that the receiving device 12 is also a packet device, and therefore had to convert from packets to PSTN format for transmission. If it were possible for the sending device to discover the nature of the receiving device as a packet device, the coding and decoding for PSTN format would be unnecessary.

SUMMARY

One aspect of the disclosure is a network device that allows packet relay across a public switched telephone network. The network device has a converter operable to convert a packet data stream to a public switched telephone network data stream. The converter may be a voice codec or a modem, as examples. The network device also includes a controller that can send signals in the public switched telephone network data stream announcing the network device as a packet device, receive signals indicating at least one other network device is participating in a public switched transmission session through a digital interface with the network device, and then send the packet data stream across the public switched transmission network directly to the at least one other network device.

Another aspect of the disclosure is a method for transmitting packets across a telephone network. The method includes the steps of establishing a link between two network devices using PSTN. Once the PSTN link is established, identifying signals are used to allow the network devices to identify themselves to each other. Once the network devices have identified each other, they alter the mode of communications to transmit packets across the telephone network.

BRIEF DESCRIPTION OF THE DRAWINGS

The invention may be best understood by reading the disclosure with reference to the drawings, wherein:

FIG. 3 shows a block diagram of a network device capable of discovering or determining if another device participating in a call over the PSTN is a packet device, in accordance with the invention.

FIG. 4 shows a flowchart of one embodiment of a method for establishing packet communication in accordance with the invention.

DETAILED DESCRIPTION OF THE EMBODIMENTS

Figure 1:
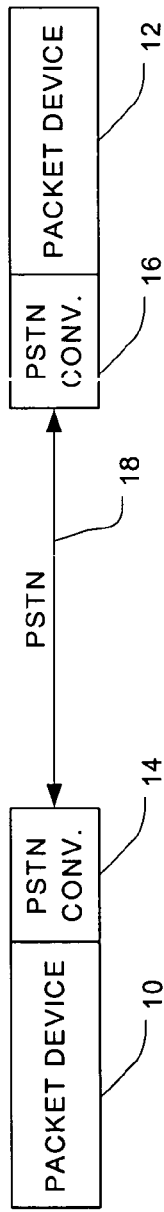
FIG. 1 shows a block diagram of an example of two packet devices participating in a call over the PSTN, in accordance with the prior art.
Figure 2:
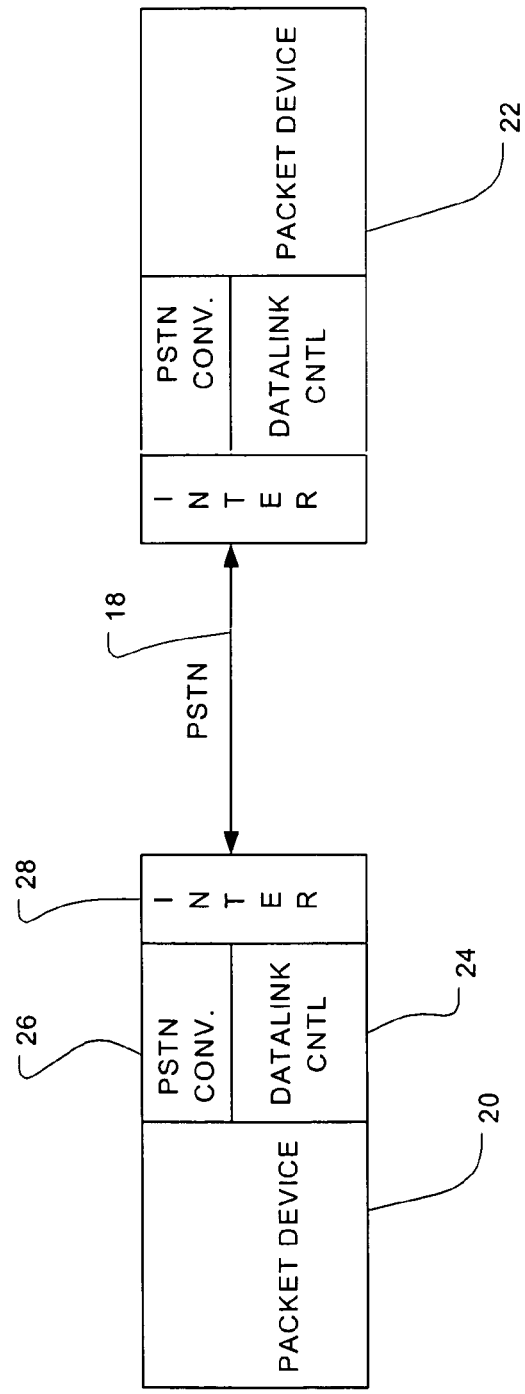
FIG. 2 shows a block diagram of two packet devices with digital PSTN interfaces participating in a call over the PSTN, in accordance with the invention.

As discussed previously, FIG. 1 shows a prior art embodiment of two packet devices participating in a call via the public switched telephone network (PSTN). FIG. 2 shows one embodiment of two packet devices participating in a call that is established across the PSTN and has an initial PSTN audio data stream between the two devices. However, once the devices discover each other to be packet devices, the PSTN connection is used to transmit packets.

Packet device as used here will refer to any device capable of sending data in packetized form. This may include servers, routers, gateways, individual workstations, stand-alone packet telephony devices, or other network devices that participate in traffic on a network. The only characteristic of any importance is the devices ability to send and receive packet data. Network devices that do so are referred to as packet devices.

In FIG. 2, a first network device 20 operating in the packet domain has been directed to establish a PSTN connection with another user. The network device 20 establishes a communication link using the PSTN. Initially, the data transferring between the network device 20 any other devices participating in the PSTN call is a PSTN data stream 18. The PSTN converter 24 in device 20 converts the data stream from a packet data stream to a PSTN data stream. For voice calls, the PSTN converter is usually a voice coder/decoder (codec). For data calls, the PSTN converter is typically a modem.

As will be discussed further with regard to FIG. 4, the first network device uses transmission signals within the PSTN data stream to identify at least one other network device participating in the communication session. In this example network device 22 is identified as another network device operating in the packet domain. It should be noted that the network device 22 is a packet device configured similarly to packet device 20. This is only for ease of discussion and is in no way intended to limit application of the invention.

Once another packet device is identified the communication session between the first network device 20 and the other devices participating in the call, the first network device no longer uses PSTN converter 24 to convert the packet data stream to a PSTN data stream 18. For example, in FIG. 2, the first network device sends packets across the PSTN connection to the other network device 22 that has been identified as a packet device. This avoids having the employ the PSTN converters. Data link controllers may control the packet stream. The packet data stream on the PSTN link 18 may be referred to as Packet Relay Across Telephone (PRAT).

One embodiment of the network device 20 is shown in FIG. 3. The network device may be configured in several different ways, as will be discussed further. In an initial configuration, the network device comprises a controller 32 and a PSTN converter 24. The controller manages generation of the necessary identifying signals to be sent within the PSTN data stream that identify the network device as a packet device. The controller also handles the network device response to identifying signals received from another network device that is a packet device. The controller will also manage the direct sending of the packet data stream over the PSTN and the elimination of conversion to a PSTN data stream.

The network device may have only one integrated circuit, such as a processor, that performs both of these functions. In this instance the box 40 would show the controller. Alternatively, the functions of generating and responding to the identifying signals may be handled by a separate device than the interface with the PSTN data stream. In this instance, for example, the controller 32 is actually comprised of more than one integrated circuit, being comprised of signal processing unit 34 and interface 36.

In addition to these aspects of the network device 20, there may be one or more connectors allowing the device to participate in the network and to use PSTN. For example, a connector 30, such as an Ethernet interface, may allow the network device to connect to a network, for example, a local area network (LAN) or a wide area network (WAN), over which it sends and receives packet data. A second connector 38 may allow the network device to connect to the PSTN. Alternatively, the network device may use the same connector for both of these functions and connects through the network to the device that actually performs the dial out to the PSTN. These are merely intended as examples and in no way are intended to limit the scope of the invention.

The network device of FIG. 3 is operable to perform the task shown in the flowchart of FIG. 4. This is one embodiment of a process for transmitting packets across a PSTN connection. It must be noted that the International Telephony Union (ITU) has a Recommendation for "Data Communication Over the Telephone Network," called Recommendation V.8 (ITU V.8). The current Recommendation of May 1999 is to be superseded by a new version that was due out in November 2000, but has not yet been published. However, the framework of V.8 is useful to demonstrate how this type of communication protocol can be extended to include identifying signals useful in application of the invention.

The advantage of using the ITU V.8 framework is its wide acceptance. If the ITU recommends a particular way in which packet devices can be recognized by other packet devices over a PSTN connection, widespread use of that recommendation will result. This allows a relatively high volume of products and services to employ the recommendation and be compatible with several other products and services. However, the methods of the invention discussed herein may be applicable to any type of pre-connection signaling performed by communications equipment and no limitation to ITU V.8 is intended.

As mentioned above, V.8 is extensible and may be adapted to identifying participants in a PSTN session as packet devices, allowing packet relay across telephone (PRAT) transmission. It is useful to discuss an overview of ITU V.8 as an example of a possible framework for application of the invention.

During the preliminary stages of a PSTN call, several tones can be transmitted between the participants prior to the call actually being set up. The entire call time, from preliminary negotiations to call establishment will be referred to as a communication session. During the preliminary stages, the participants of the call identify themselves as a particular piece of equipment. For example, the tone sent by one fax machine is identified by a receiving fax machine and a fax session is established. The low speed data exchange that sounds like a burst of static during a modem dial-up establishes the parameters of the data connection to follow.

In ITU V.8, a call indicator can replace a call tone. The call indicator has several sets of data bits that are predefined. The receiving equipment can then decode the call indicator data to determine many aspects of the call. The data bits are organized in octets in the current version of V.8. The new version of V.8 may be in another format, but as the invention is not limited to V.8, the use of the current V.8 as an example still provides a useful demonstration of a framework for application of the invention.

During a call indicator, a first octet is transmitted that identifies the call category. The octets used have a start bit that is always zero (0) and a stop bit that is one (1). A tag identifier provides the information category information in the first four bits of the first octet. The specifics of the individual bit settings are not necessary, but the information categories are call function, modulation modes, protocols, PSTN access, non-standard facilities, PCM modem availability, and a category specifically for definitions provided in ITU Recommendation T.66, which is beyond the scope of this disclosure.

As can be seen from the above, the 4-bit tag has sixteen possible values, from 0000 to 1111, yet only 7 are used. A new information category could be defined as PRAT, with the further octets for that category containing specific information about the particular participant, including the domain identifier, an alias to allow resolution of dynamically assigned network addresses, or a flag indicating that the network address is a permanent address, as examples.

However, there are other places within the V.8 framework within which PRAT information may be included. For example, within the call function category, there are currently eight call functions, with specific bit settings for bits b5-b7. Bits b0-b4 are used to provide the call function tag. One of these categories is data. This category could also be used to implement specific procedures for identifying packet devices participating in a PSTN call.

Another example is in the protocol category. Within the protocol category, b5-b7 can be set to 111 to indicate a protocol as indicated in an extension octet. This extension octet could identify the protocol as a packet protocol and then provide the necessary information to allow PRAT. Yet another example is in the Non-standard information field. Again, this field could be used to specify that the connection includes at least two packet devices that can establish a PRAT connection across the PSTN, avoiding any PSTN conversions.

These are all examples of how a PRAT protocol could be established within existing telephony transmission frameworks. Limitation to ITU V.8 is not intended and in only used as an example of a possible implementation of the methods of the invention. For example, robbed bit signaling can be used in much the same way. Robbed bit signaling emulates older analog trunk and line signal methods that are transmitted in many networks. In countries that support T1 framing (such as the United States and Canada), many networks send supervisory and signaling information to each other by removing the 8th bit of each timeslot of the 6th and 12th frame for superframe (SF) framing. This is done to support channel banks in the network that convert various battery and ground operations on analog lines into signaling bits that are forwarded over digital lines.

FIG. 4 shows a flowchart of one embodiment of a method for packet transmission across the PSTN. In 42, a PSTN communication session is established. It must be noted, that as defined above, a communications session includes the preliminary signaling performed prior to actual establishment of the call. In 44, transmission of identifying signals is used to identify other packet devices as participants in a PSTN call. If the network device shown in FIG. 2 were the calling device, using transmission of identifying signals would involve the calling device sending out signals identifying it as a packet device. If the network device shown in FIG. 2 were the called device, using transmission of identifying signals would involve the device receiving signals from the calling device indicating that the calling device was a packet device.

Once the identifying signals are transmitted and answered, both devices would alter the communications mode to avoid use of the PSTN converters at 46. Packet relay across the telephone network would then commence. Alteration of communication for both devices would typically involve sending packets directly across the PSTN and receiving packets in such as manner as to avoid the PSTN converter.

As an option to facilitate communication between packet devices in the future, optional steps 48 and 50 may occur during an initial call between two packet devices. Once PRAT commences, the two devices may exchange information about their respective domains, configurations and identifiers. Each device could then store this information. When the two devices again get connected through the PSTN, each device could access the store and determine the necessary information for that device. This would facilitate communication between packet devices across the PSTN.

The method may be implemented in software and used as an upgrade to existing network devices that already have the necessary components to implement the invention. In this example, the software code would more than likely be distributed in some sort of computer-readable form. The computer in this case would be the network device of whatever configuration. The software code would be included on the computer-readable medium and installed in the network device. When the code is executed, it would implement the steps of the invention as discussed above.

In this manner, packet devices can avoid the unnecessary steps of converting packet data streams to PSTN data streams and back again. This provides higher efficiency and may result in more accurate data transmission, as no loss through coding or decoding will occur.

Thus, although there has been described to this point a particular embodiment for a method and apparatus for packet transmission across telephone networks, it is not intended that such specific references be considered as limitations upon the scope of this invention except in-so-far as set forth in the following claims.

What is claimed is:

1. A network device, comprising:
    a converter to receive a packet data stream intended for a packet domain and to convert the packet data stream into an altered data stream intended for transmission through a public switched telephone network; and
    a controller to:
        establish a connection through the public switched telephone network with at least one other network device using the altered data stream;
        send signals through the converter in the altered data stream identifying the network device as a packet device that can receive packet data;
        determine, using signals received from one of the other network devices, whether the other network device is a packet device that can receive packet data;
        send the packet data stream to the other network device, if the network device determines that the other network device is a packet device that can receive packet data; and
        send the altered data stream to the other network device, if the network device determines that the other network device is not a packet device and cannot receive packet data.

2. The network device of claim 1, wherein the network device comprises a voice gateway.

3. The network device of claim 1, wherein the packet data stream comprises one of either coded voice or data.

4. The network device of claim 1, wherein the converter comprises one of either a voice coder/decoder or a modem.

5. The network device of claim 1, wherein the controller employs one of either ITU V.8 protocols, or robbed-bit signaling to identify the network device as a packet device.

6. A method, comprising:
    receiving a packet data stream intended for a packet domain;
    converting the packet data stream into a altered data stream intended for transmission through a public switched telephone network;
    establishing a connection through the public switched telephone network with at least one other network device using the altered data stream;
    sending signals through the converter in the altered data stream identifying the network device as a packet device that can receive packet data;
    determining, using signals received from the other network device, whether the other network device is a packet device that can receive packet data;
    sending the packet data stream to the other network device, if the network device determines that the other network device is a packet device that can receive packet data; and
    sending the altered data stream to the other network device, if the network device determines that the other network device is not a packet device and cannot receive packet data.

7. The method of claim 6, wherein sending signals comprises sending signals in accordance with ITU Recommendation V.8.

8. The method of claim 6, wherein converting the packet data stream further comprises using one of either a voice coder/decoder or a modem to convert the packet data stream to the altered data stream.

9. The method of claim 6, comprising gathering information on the other network device and storing the information for further use.

10. The method of claim 6, wherein determining comprises:
    accessing a storage of known network devices based upon the signals received from the other device;
    locating information about the other network device; and
    using that information in determining whether the other device is a packet device.

* * * * *